(12) United States Patent
Miura (10) Patent No.: US 9,277,173 B2
(45) Date of Patent: Mar. 1, 2016

(54) COMMUNICATION DEVICE

(75) Inventor: Atsushi Miura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 408 days.

(21) Appl. No.: 13/059,712

(22) PCT Filed: Aug. 28, 2009

(86) PCT No.: PCT/JP2009/065122
§ 371 (c)(1),
(2), (4) Date: Feb. 18, 2011

(87) PCT Pub. No.: WO2010/024415
PCT Pub. Date: Mar. 4, 2010

(65) Prior Publication Data
US 2011/0141220 A1 Jun. 16, 2011

(30) Foreign Application Priority Data
Aug. 28, 2008 (JP) .................. 2008-220444

(51) Int. Cl.
*H04N 7/14* (2006.01)
*H04L 12/40* (2006.01)
(Continued)

(52) U.S. Cl.
CPC .......... *H04N 7/147* (2013.01); *H04L 12/40013* (2013.01); *H04M 11/085* (2013.01); *H04N 7/142* (2013.01); *H04N 21/41407* (2013.01); *H04N 21/42202* (2013.01); *H04N 21/44008* (2013.01); *H04N 21/4436* (2013.01);
(Continued)

(58) Field of Classification Search
USPC ................. 348/14.01–14.08, 14.09
See application file for complete search history.

(56) References Cited

U.S. PATENT DOCUMENTS 7,518,631 B2 * 4/2009 Hershey et al. ............... 348/14.1
7,564,476 B1 * 7/2009 Coughlan .............. H04N 7/147
348/14.01
(Continued)

FOREIGN PATENT DOCUMENTS

JP 2001-54085 A 2/2001
JP 2002-163921 A 6/2002
(Continued)

OTHER PUBLICATIONS

Japanese Office Action "Final Rejection" dated Oct. 30, 2012, which corresponds to Japanese Patent Application No. 2010-526802 and is related to U.S. Appl. No. 13/059,712 with translation.
(Continued)

*Primary Examiner* — Maria El-Zoobi
(74) *Attorney, Agent, or Firm* — Studebaker & Brackett PC (57) ABSTRACT

A communication device is provided which can smoothly perform communication using a video phone function by suppressing the video phone function depending on whether the video phone function is in an effective condition.

When an incoming call using the video phone function is occurred or when an outgoing call using the video phone function is performed, a control unit determines whether the video phone function is in the effective condition. Only when it is determined that the video phone function is in the effective condition, the control unit starts communication using the video phone function. When it is determined that the video phone function is not in the effective condition, the control unit 10 executes control to perform only audio communication without performing the communication using the video phone function.

10 Claims, 3 Drawing Sheets

(51) Int. Cl.
*H04M 11/08* (2006.01)
*H04N 21/414* (2011.01)
*H04N 21/422* (2011.01)
*H04N 21/44* (2011.01)
*H04N 21/443* (2011.01)
*H04N 21/4788* (2011.01)
*H04W 52/02* (2009.01)

(52) U.S. Cl.
CPC ...... *H04N21/4788* (2013.01); *H04N 2007/145* (2013.01); *H04W 52/0267* (2013.01)

(56) References Cited

U.S. PATENT DOCUMENTS

| | | | | |
|---|---|---|---|---|
| 7,827,698 | B2 * | 11/2010 | Jaiswal et al. | 33/366.11 |
| 8,571,215 | B2 * | 10/2013 | Taleb | H04N 21/2335 370/236 |
| 2003/0142854 | A1 * | 7/2003 | Cho et al. | 382/118 |
| 2006/0105801 | A1 * | 5/2006 | Cho | 455/550.1 |
| 2006/0151678 | A1 * | 7/2006 | Shibata | 250/205 |
| 2006/0274155 | A1 * | 12/2006 | Kim | H04M 1/0241 348/208.3 |
| 2007/0016426 | A1 | 1/2007 | Hershey et al. | |
| 2009/0002478 | A1 * | 1/2009 | Ueki | 348/14.01 |
| 2009/0049166 | A1 * | 2/2009 | Roman | H04L 41/0213 709/223 |
| 2009/0167738 | A1 * | 7/2009 | Gotanda | 345/207 |
| 2010/0079508 | A1 * | 4/2010 | Hodge | G06F 3/013 345/697 |
| 2012/0001722 | A1 * | 1/2012 | Jaiswal et al. | 340/3.1 |
| 2014/0056492 | A1 * | 2/2014 | Geosimonian | 382/118 |

FOREIGN PATENT DOCUMENTS

| | | |
|---|---|---|
| JP | 2004-032305 A | 1/2004 |
| JP | 2005-236597 A | 9/2005 |
| JP | 2006-100980 A | 4/2006 |
| JP | 2008-028586 A | 2/2008 |

OTHER PUBLICATIONS

An Office Action issued by the Korean Intellectual Property Office on Apr. 23, 2013, which corresponds to Korean Patent Application No. 10-2011-7006946 and is related to U.S. Appl. No. 13/059,712; with translation.

* cited by examiner

COMMUNICATION DEVICE

TECHNICAL FIELD

The present invention relates to a communication device having a video phone function.

BACKGROUND ART

A communication device has been known which has a video phone function capable of performing audio communication while seeing an image of a called party.

The video phone function is a function of acquiring an image of a calling party by a camera imaging the calling party as well as an audio signal for audio communication and transmitting/receiving the image with the audio signal. When an image signal of a called party is acquired, an image from the called party is displayed on a display unit. Thereby, the calling party can perform communication while seeing the called party. In particular, when generating a moving picture by shortening an interval to capture the image and transmitting/receiving the moving picture, it is possible to perceive the image of the called party in more details.

However, in some cases, it may not be possible to use the video phone function depending on surrounding environments or conditions of the calling party. Regarding this, Patent Literature 1 discloses a technology of enabling a user to switch a video phone function and a typical audio communication function.

In addition, even though the calling party tries to use the video phone function, when a communication terminal of the called party does not support the video phone function, the video phone function cannot be used. Regarding this, Patent Literature 2 discloses a technology of checking whether the communication terminal of the called party supports the video phone function in advance.

Patent Literature 1: JP-A-2002-163921
Patent Literature 2: JP-A-2008-28586

DISCLOSURE OF THE INVENTION

Problems that the Invention is to Solve

When the video phone function is used under state in which the video phone function is not in an effective condition, the communication by the video phone function may not be smoothly performed.

An object of the invention is to provide a communication device that can smoothly perform communication using a video phone function by suppressing the video phone function depending on whether the video phone function is in an effective condition.

Means for Solving the Problems

According to a first aspect of the invention, there is provided a communication device comprising: an imaging unit; and a control unit that executes a video phone function based on an image captured by the imaging unit, wherein the control unit suppresses execution of the video phone function when the image captured by the imaging unit satisfies a predetermined condition.

Preferably, the communication device further comprises a face information detection unit that detects information about a user's face from the image captured by the imaging unit, wherein the control unit suppresses the execution of the video phone function when the user's face is not detected from the image captured by the imaging unit by the face information detection unit.

Preferably, the communication device further comprises an audio detection unit, wherein the control unit suppresses the execution of the video phone function by suppressing transmission of the image captured by the imaging unit while transmitting audio detected by the audio detection unit.

Preferably, the control unit suppresses the execution of the video phone function by suppressing the imaging unit from capturing an image.

Preferably, the communication device further comprises a display unit, wherein the control unit displays on the display unit an image that is transmitted from the other party for which the video phone function is executed while suppressing the execution of the video phone function.

Preferably, the control unit releases the execution suppression of the video phone function when the image captured by the imaging unit does not satisfy the predetermined condition while suppressing the execution of the video phone function.

According to a second aspect of the invention, there is provided a communication device comprising: a luminous intensity detection unit; an imaging unit; and a control unit that executes a video phone function based on an image captured by the imaging unit, wherein the control unit suppresses execution of the video phone function when a luminous intensity lower than a predetermined luminous intensity is detected by the luminous intensity detection unit.

Preferably, the communication device further comprises an audio detection unit, wherein the control unit suppresses the execution of the video phone function by suppressing transmission of the image captured by the imaging unit while transmitting audio detected by the audio detection unit.

Preferably, the control unit suppresses the execution of the video phone function by suppressing the imaging unit from capturing an image.

Preferably, the communication device further comprises a display unit, wherein the control unit displays on the display unit an image that is transmitted from the other party for which the video phone function is executed while suppressing the execution of the video phone function.

According to a third aspect of the invention, there is provided a communication device comprising: a casing state detection unit; an imaging unit; and a control unit that executes a video phone function based on an image captured by the imaging unit, wherein the control unit suppresses execution of the video phone function when a displacement of a casing equal to or larger than a predetermined value is detected by the casing state detection unit.

Preferably, the communication device further comprises an audio detection unit, wherein the control unit suppresses the execution of the video phone function by suppressing transmission of the image captured by the imaging unit while transmitting audio detected by the audio detection unit.

Preferably, the control unit suppresses the execution of the video phone function by suppressing the imaging unit from capturing an image.

Preferably, the control unit releases the execution suppression of the video phone function when a predetermined condition is not detected by the casing state detection unit while suppressing the execution of the video phone function.

EFFECTS OF THE INVENTION

According to the invention, it is possible to smoothly perform communication using the video phone function by suppressing the video phone function depending on whether the video phone function is in an effective condition.

BEST MODE FOR CARRYING OUT THE INVENTION

Hereinafter, a mobile terminal 100 according to an illustrative embodiment of a communication device of the invention will be described.

The mobile terminal 100 relates to a mobile phone.

Figure 1:
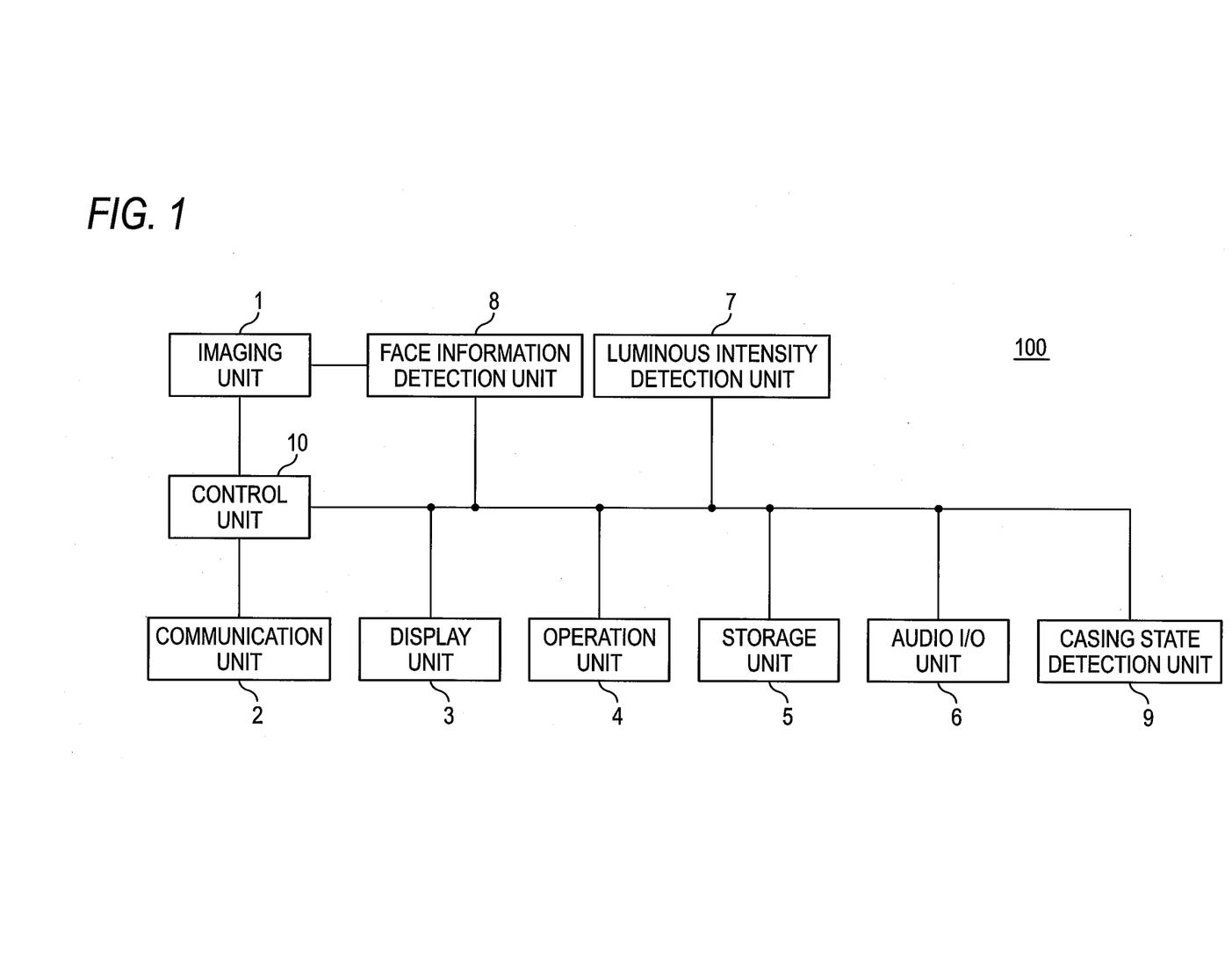
FIG. 1 is a block diagram showing an illustrative embodiment of a configuration of a mobile terminal.

FIG. 1 is a block diagram showing an illustrative embodiment of a configuration of the mobile terminal 100.

Figure 2:
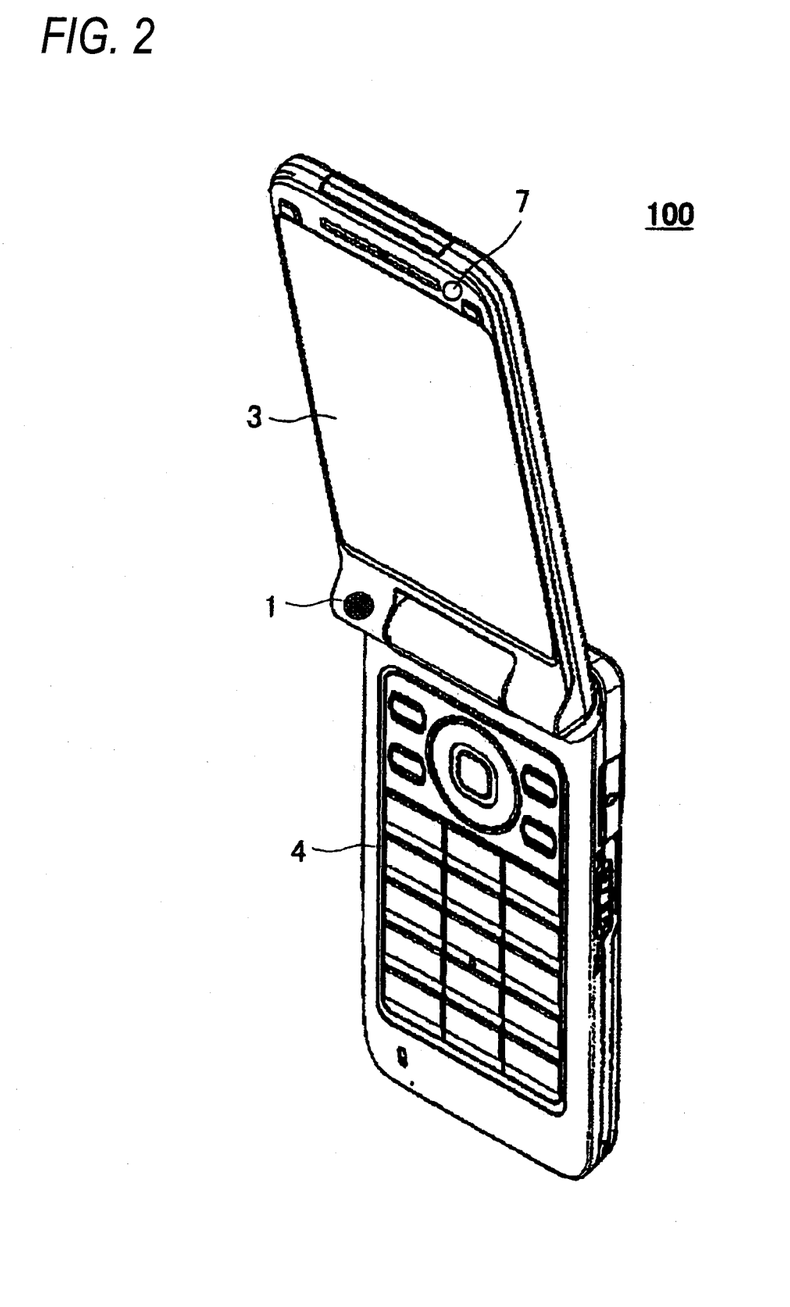
FIG. 2 shows an outward appearance of an example of a front side of the mobile terminal.

FIG. 2 shows an outward appearance of an example of a front side of the mobile terminal 100.

As shown in FIG. 1, the mobile terminal 100 includes an imaging unit 1, a communication unit 2, a display unit 3, an operation unit 4, a storage unit 5, an audio I/O unit 6, a luminous intensity detection unit 7, a face information detection unit 8, a casing state detection unit 9 and a control unit 10.

The imaging unit 1 is a camera device using a solid imaging device such as CMOS (Complementary Metal-Oxide Semiconductor), CCD (Charge Coupled Device) and the like.

As shown in FIG. 2, the imaging unit 1 is provided on a front side of the mobile terminal 100.

The mobile terminal 100 of this illustrative embodiment is a folder-type mobile phone, as shown in FIG. 2. In general, respective functions of the mobile terminal 100 are used under state in which a folder is opened (state shown in FIG. 2). The imaging unit 1 is provided on the front side of the mobile terminal 100 so as to capture a user's face of the mobile terminal 100 under the opened state, as shown in FIG. 2.

Incidentally, the imaging unit 100 may be provided to other positions in addition to the front side of the mobile terminal 100. In other words, a plurality of imaging units 1 may be provided. In this case, when using the imaging units 1, it may be possible to select which imaging unit 1 is used, based on an operation of the user. In addition, a position of the imaging unit 1 provided on the front side of the mobile terminal 100 is not limited to the position shown in FIG. 2, and the imaging unit may be provided on any position of the front side of the mobile terminal 100.

The communication unit 2 performs wireless communication with a base station that is not shown in FIG. 1. For example, the communication unit 2 executes a predetermined modulation process for transmission data supplied from the control unit 10, which will be described later, and converts and transmits the data into a wireless signal. In addition, the communication unit 2 executes a predetermined demodulation process for a wireless signal received from the base station and converts and outputs the signal into reception data to the control unit 10.

The data transmitted/received by the communication unit 2 includes audio data in performing audio communication by the mobile terminal 100, mail data in transmitting/receiving a mail, image data attached to the data, data (including audio data and image data) for a video phone in using a video phone function and the like, for example.

The display unit 3 is a display device consisting of a liquid crystal display panel, an organic electro-luminescence (EL) panel and the like. The display unit 3 displays an image corresponding to the image data supplied from the control unit 10.

For example, the display unit 3 displays a phone number of a destination of an outgoing call, a phone number of a calling party of an incoming call, a content of a reception or transmission mail, an image captured by the imaging unit 1, a browser screen of an Internet Web page, a standby screen, a date, time, a remaining amount of a battery, an image of a called party in using the video phone function, and the like.

The operation unit 4 is an input device including key/button groups having various functions, such as number keys, character keys, cursor keys, an enter key and the like. When a user operates the key, the operation unit 4 converts the operation content into an electric signal and notifies the control unit 10 of the operation.

The storage unit 5 is a memory device such as ROM (Read Only Memory), RAM (Random Access Memory) and the like. The storage unit 5 stores data of various processes of the mobile terminal 100 and programs with which the control unit 10 executes various functions of the mobile terminal 100.

The audio I/O unit 6 detects an audio signal that is input/output through a speaker and a microphone, which are not shown, processes the audio signal so that the communication unit 2 can transmits/receives the signal. Specifically, the audio I/O unit 6 performs signal processing of an audio signal input from the microphone, such as amplification, analog-digital conversion, encoding and the like, converts the audio signal into digital audio data and outputs the digital data to the control unit 10. In addition, the audio I/O unit 6 performs signal processing of audio data supplied from the control unit 10, such as decoding, digital-analog conversion, amplification and the like, converts the digital signal into analog audio data and outputs the analog data from the speaker.

The luminous intensity detection unit 7 detects a luminous intensity of an environment in which the mobile terminal 100 is put.

The luminous intensity detection unit 7 is a photo sensor, for example, and is arranged on the front side of the mobile terminal 100, as shown in FIG. 2. Specifically, the luminous intensity detection unit 7 is provided on a side of the mobile terminal 100 which is the same side as the imaging unit 1 capable of imaging a user's face. This is because, based on the luminous intensity detected by the luminous intensity detection unit 7, it is determined whether an image captured by the imaging unit 1 capable of imaging a user's face has a predetermined luminous intensity and whether an image enabling the user's face to be recognized is captured by the imaging unit 1 when executing the video phone function that will be described later.

A method of detecting a luminous intensity by the luminous intensity detection unit 7 is not particularly limited. For example, the conventional luminous intensity detecting technology may be used.

The face information detection unit 8 is an image processing unit of detecting a user's face from an image captured by the imaging unit 1. As described above, the imaging unit 1, which is provided on the front side of the mobile terminal 100, is provided to image a user's face. However, the imaging unit 1 provided on the front side of the mobile terminal 100 may not image a user's face well depending on holding angles of the mobile terminal 100 by the user.

The face information detection unit 8 detects whether a user's face is taken in an image captured by the imaging unit 1 and transmits a result thereof to the control unit 1. Thereby, when a user's face is not taken in an image captured by the imaging unit 1, the control unit 10 can notify the user of the situation.

Here, the situation that a user's face is taken in an image captured by the imaging unit 1, which is detected by the face information detection unit 8, corresponds to that a predetermined condition of the invention is satisfied.

A method of detecting a user's face by the face information detection unit 8 is not particularly limited. For example, the conventional face detecting technology may be used.

In addition, even though the face information detection unit 8 detects a user's face in the image captured by the imaging unit 1, when a size of the detected face is smaller than a predetermined size, the control unit 10 may determine that the user's face is not detected.

The casing state detection unit 9 detects a displacement of the mobile terminal 100 (casing).

For example, when a user uses the mobile terminal 100 while running, an image captured by the imaging unit 1 is highly out of focus, so that a called party may not discriminate the image.

The casing state detection unit 9 uses a sensor to detect a state of the mobile terminal 100. For instance, the casing state detection unit 9 uses a tilt sensor, which detects three-dimensional tilts of X, Y and Z axes of the mobile terminal 100, to sample tilts of the mobile terminal 100 with regard to X, Y and Z axes, respectively, and acquires differences between tilt values obtained in the just previous sampling and tilt values obtained in this sampling. The casing state detection unit 9 compares absolute values of the differences with threshold values of differences. When the number of times that the absolute values of the differences are larger than threshold values of differences exceeds the predetermined number of times, the casing state detection unit 9 determines that the mobile terminal 100 is highly displaced.

Here, the threshold values of differences can be individually set for X, Y and Z axes. The tilt sensor may be configured to detect one-dimensional or two-dimensional tilts of the mobile terminal 100. In addition, the predetermined number of times, which is compared with the number of times that the absolute values of the differences are larger than threshold values of differences, can be arbitrarily set. Incidentally, the threshold values of the differences and the predetermined number of times can be freely changed depending on conditions. For example, they can be changed depending on the luminous intensity detected by the luminous intensity detection unit 7.

In addition, when acquiring the differences between tilt values obtained in the just previous sampling and tilt values obtained in this sampling and comparing the absolute values of the differences with the threshold values of differences, plus and minus conditions of the differences may be added to a condition of determining the displacement of the mobile terminal 100. For example, when the differences of the tilt values are continuously plus or minus, it may be determined that the mobile terminal 100 is displaced in the same direction but does not satisfy the predetermined condition.

Incidentally, the casing state detection unit 9 is not limited to the tilt sensor. For example, an accelerometer sensor may be used. Alternatively, the casing state detection unit 9 may be configured to compare blur of an image captured by the imaging unit 1 with a predetermined value and to thus detect a high displacement of the mobile terminal 100.

The casing state detection unit 9 detects whether the mobile terminal 100 is displaced or not and transmits a result thereof to the control unit 10. Thereby, when the mobile terminal 100 is displaced, the control unit 10 can suppress the video phone function.

Here, the situation that the mobile terminal 100 is displaced by a predetermined value or more, which is detected by the casing state detection unit 9, corresponds to that a predetermined condition of the invention is satisfied. It may be determined whether the displacement is equal to or larger than a predetermined value by setting an appropriate condition.

Incidentally, a method of detecting a displacement of the mobile terminal 100 by the casing state detection unit 9 is not particularly limited. For example, the conventional detecting technology may be used.

The control unit 10 is a control block that collectively controls the above configurations and executes respective operations and processes of the mobile terminal 100. The control unit 10 is configured by a central processing unit (CPU), for example.

The functions of the mobile terminal 100, which are executed by the control unit 10, include audio communication, main transmitting and receiving, Web browsing and video phone functions.

In addition, the control unit 10 can suppress execution of the video phone function, based on whether an image captured by the imaging unit 1 satisfies a predetermined condition (i.e., whether the face information detection unit 8 detects a user's face in the image), the luminous intensity detected by the luminous intensity detection unit 7 or the displacement of the mobile terminal 100 detected by the casing state detection unit 9.

In the followings, the video phone function will be specifically described.

The video phone function is a function of transmitting and receiving an image of a user's face to and from a communication terminal of a called party, in addition to the typical audio communication function. That is, the video phone function is a function enabling a user to have a conversation with a called party while seeing the image displayed on the display unit 3, in which a face of the called party is taken.

The image captured by the imaging unit 1 may be a moving picture or still image. For a still image, the still image may be updated with a new image at a predetermined time interval so as to give the still image with a predetermined degree of movement.

In the followings, an operation of the mobile terminal 100 will be exemplified in executing the video phone function.

Figure 3:
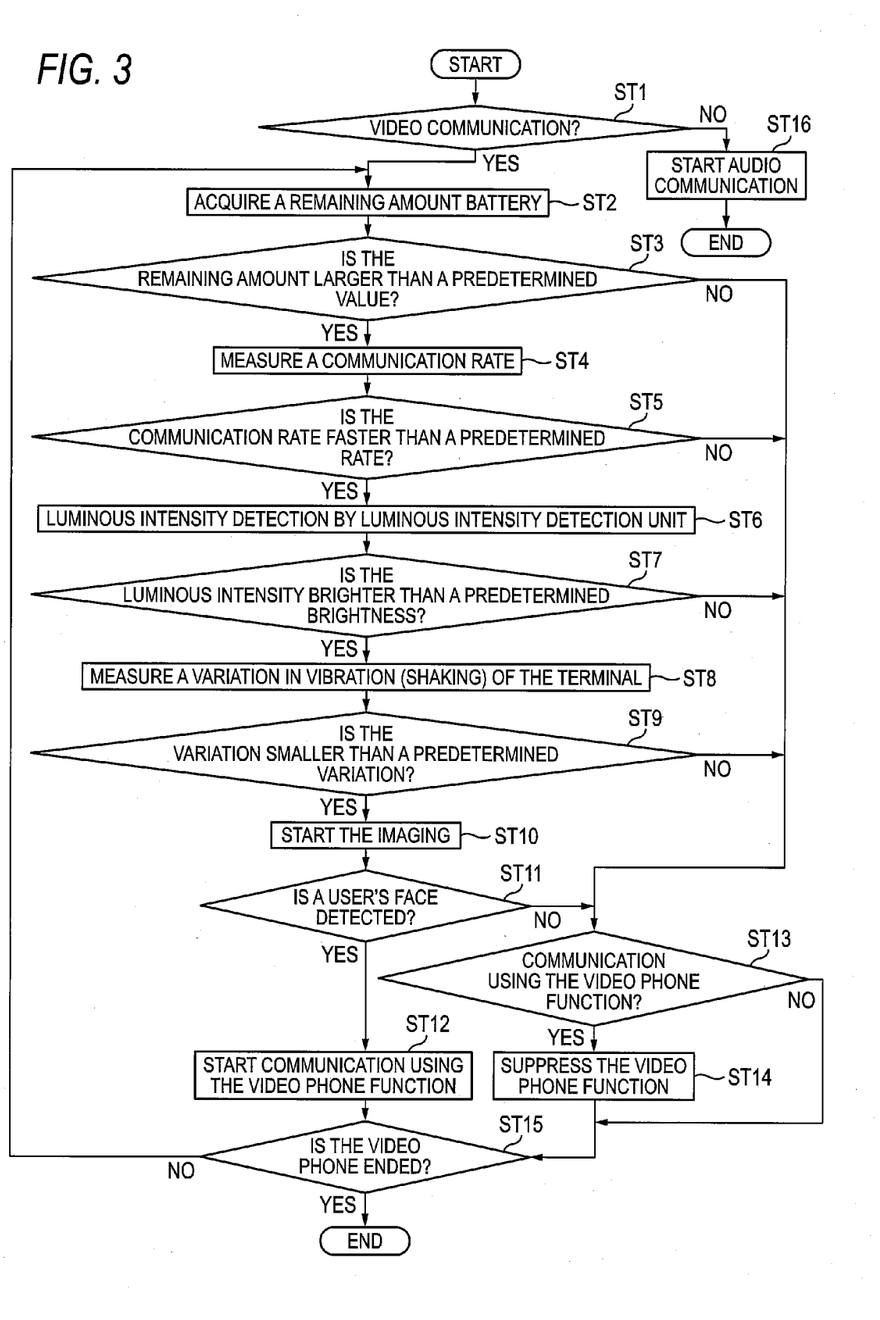
FIG. 3 is a flow chart showing an operation example of the mobile terminal when executing a video phone function.

FIG. 3 is a flow chart showing an operation example of the mobile terminal 100 when executing a video phone function.

Step ST1:

The control unit 10 determines whether an incoming call from a called party is a request for call using the video phone function or a request for audio communication only.

Alternatively, the control unit 10 determines whether, when a user performs an outgoing call the user transmits a request for call using the video phone function or a request for audio communication only.

When the incoming call or outgoing call is a request for call using the video phone function, the control unit 10 proceeds to a step ST2, and when the incoming call or outgoing call is a request for audio communication only, the control unit 10 proceeds to a step ST16.

Step ST2:

The control unit 10 acquires a remaining amount of a battery of the mobile terminal 100.

Step ST3:

When the remaining amount of the battery acquired in step ST2 is equal to or larger than a predetermined value, the control unit 10 proceeds to a step ST4, and when the acquired remaining amount of the battery is less than a predetermined value, the control unit 10 proceeds to a step ST13.

Step ST4:

The control unit 10 measures a communication rate of the mobile terminal 100.

Step ST5:

When the communication rate measured in step ST4 is equal to or greater than a predetermined value (i.e., the communication rate is a predetermined communication rate or faster), the control unit 10 proceeds to a step ST6, and when the measured communication rate is less than a predetermined value (i.e., the communication rate is slower than a predetermined communication rate), the control unit 10 proceeds to a step ST13.

Step ST6:

The control unit 10 enables the luminous intensity detection unit 7 to detect a luminous intensity.

As described above, the luminous intensity detection unit 7 is provided on the front side of the mobile terminal 100, i.e., on the same side as the imaging unit 1 for taking a picture of a user's face. Specifically, when the luminous intensity detection unit 7 detects a luminous intensity, it is possible to determine whether the imaging unit 1 can take a picture of a user's face well.

Step ST7:

When the luminous intensity, which is detected by the luminous intensity detection unit 7 in step ST6, is equal to or higher than a predetermined luminous intensity (i.e., the luminous intensity is a predetermined brightness or higher), the control unit 10 proceeds to a step ST8, and when the detected luminous intensity is less than a predetermined luminous intensity (i.e., the luminous intensity is darker than a predetermined brightness), the control unit 10 proceeds to a step ST13.

Step ST8:

The control unit 10 enables the casing state detection unit 9 to detect a displacement of the mobile terminal 100.

Step ST9:

Regarding a detection result of the displacement by the casing state detection unit 9, when the mobile terminal 100 is displaced and but not shaken (i.e., displacement is smaller than a predetermined value) (i.e., when a predetermined condition is not detected), the control unit proceeds to a step ST10, and when the mobile terminal 100 is displaced and shaken (i.e., when a predetermined condition is detected), the control unit proceeds to a step ST13.

Step ST10:

The control unit 10 enables the imaging unit 1, which is provided on the front side of the mobile terminal 100, to start an imaging.

Step ST11:

The control unit 10 enables the face information detection unit 8 to detect a face in the image captured by the imaging unit in step ST10.

Regarding a detection result of the face by the face information detection unit 8, when a user's face is detected in the image captured by the imaging unit 1, the control unit proceeds to a step ST12, and when the face is not detected, the control unit proceeds to a step ST13.

Step ST12:

The control unit 10 starts communication using the video phone function with a called party.

Specifically, the control unit 10 overlaps the image signal captured by the imaging unit 1 and the audio signal generated by the audio I/O unit 6, and transmits the overlapped signal to the called party by the communication unit 2.

Thereby, a user can perform communication using the video phone function.

Step ST13:

When it is determined in step ST3 that the remaining amount of the battery is less than a predetermined value, when it is determined in step ST5 that the communication rate is less than a predetermined value, when it is determined in step ST9 that the displacement of the mobile terminal 100 detected by the casing state detection unit 9 is high or when it is determined in step ST11 that a user's face is not detected in the image, which is captured by the imaging unit 1, by the face information detection unit 8, the control unit 10 determines whether the communication is performed by the video phone function.

When the communication is performed by the video phone function, the control unit proceeds to a step ST14, and when the communication is not performed by the video phone function, the control unit proceeds to a step ST15.

Step ST14:

The control unit 10 suppresses the video phone function.

For example, the control unit 10 suppresses the communication unit 2 from transmitting the image captured by the imaging unit 1 and transmits the audio signal generated by the audio I/O unit 6. In this case, although the imaging unit 1 performs an imaging, the image signal generated by the imaging is not transmitted to the called party by the communication unit 2.

Alternatively, the control unit 10 may suppress the imaging unit 1 from performing an imaging and then transmit the audio signal generated by the audio I/O unit 6.

Step ST15:

The control unit 10 determines whether or not to end the communication using the video phone function.

When not ending the communication using the video phone function, i.e., when continuing the communication using the video phone function, the control unit returns to step ST2 and controls the start, ending and continuing of the communication using the video phone function and the switching into an audio communication. In other words, even when the communication using the video phone function is switched over to the audio communication through steps ST13 and ST14, it is possible to resume the communication using the video phone function.

On the other hand, when ending the communication using the video phone function, the control unit ends the communication.

Step ST16:

The control unit 10 starts audio communication with a called party.

Incidentally, in the flow chart shown in FIG. 3, when it is determined in step ST7 that the luminous intensity detected by the luminous intensity detection unit 7 is lower than a predetermined luminous intensity, the luminous intensity detection by the luminous intensity detection unit 7 may be performed every predetermined time period even after the audio communication with the called party starts in step ST12 (i.e., even when the execution of the video phone function is suppressed). Furthermore, when the luminous intensity becomes equal to or higher than a predetermined value (i.e., when the luminous intensity higher than a predetermined value is detected) during the audio communication, the control unit may notify the user of the situation at that time and enable the user to select whether or not to start communication using the video phone function. Alternatively, when the luminous intensity becomes equal to or higher than a predetermined value during the audio communication, it may be possible that the imaging unit 1 automatically starts to image a user's face at that time, the face information detection unit 8 determines whether a user's face is in the image captured by the imaging unit 1, and when a user's face is detected, the communication using the video phone function starts automatically.

On the other hand, in the flow chart shown in FIG. 3, even when it is determined in step ST7 that the luminous intensity detected by the luminous intensity detection unit 7 is higher than a predetermined luminous intensity, after the communication using the video phone function starts in step ST12, the luminous intensity detection by the luminous intensity detection unit 7 may be performed every predetermined time period. Furthermore, when the luminous intensity becomes lower than a predetermined value, the control unit may notify the user of the situation at that time and enable the user to select whether or not to end the communication using the video phone function or whether or not to switch over to the audio communication. Alternatively, when the luminous intensity detected by the luminous intensity detection unit 7 becomes lower than a predetermined value, the communication using the video phone function may be automatically ended or switched over to the audio communication at that time without the notification. Thereby, it is possible to reduce a sense of strangeness with a called party, which may be caused during the communication using the video phone function.

Alternatively, even when the casing state detection unit 9 determines in step ST9 that the displacement of the mobile terminal 100 is high, after the audio communication with a called party starts (i.e., when the execution of the video phone function is suppressed) in step ST14, the casing state detection unit 9 may be enabled to detect the displacement of the mobile terminal 100 every predetermined time period, for example. Further, when it is determined that the displacement of the mobile terminal 100 has disappeared (i.e., when a predetermined condition is not detected), the communication using the video phone function may start automatically.

Incidentally, for the configuration in which the casing state detection unit 9 compares the burr of the image captured by the imaging unit 1 with a predetermined value and thus detects that the mobile terminal 100 is highly displaced, the control unit may perform the processes of steps ST8 and ST9 after the processes of steps ST10 and ST11 by the face information detection unit 8.

Alternatively, even when the face information detection unit 8 determines in step ST11 that a user's face is not detected in the image captured by the imaging unit 1, after the audio communication with the called party starts in step ST14, the face information detection unit 8 may be enabled to perform the process of detecting a user's face in the image captured by the imaging unit 1 every predetermined time period. Furthermore, when a user's face is detected (i.e., when the image does not satisfy a predetermined condition), the communication using the video phone function may start automatically or depending on a user's selection at that time.

On the other hand, in the flow chart shown in FIG. 3, even when the face information detection unit 8 determines in step ST11 that a user's face is detected in the image captured by the imaging unit 1, after the communication using the video phone function starts in step ST12 (when the execution of the video phone function is suppressed), the face detection of the face information detection unit 8 may be performed every predetermined time period, for example. Furthermore, when the face detected by the face information detection unit 8 has disappeared or becomes smaller during the communication using the video phone function, the control unit may notify a user of the situation at that time and enable the user to select whether or not to end the communication using the video phone function or whether or not to switch over to the audio communication. Further, when the face detection by the face information detection unit 8 has disappeared or a size of the detected face becomes smaller than a predetermined size, the communication using the video phone function may be automatically ended or switched over to the audio communication at that time without the notification.

In addition, even when the image of a calling party is not transmitted (i.e., even when the luminous intensity detection unit 7 determines that the luminous intensity is lower than a predetermined value or a user's face is not detected in the image, which is captured by the imaging unit 1, by the face information detection unit 8), when an image for the video phone function is transmitted from a called party, the image may be displayed on the display unit 3. Thereby, even when an image for the video phone function cannot be transmitted because a user's face is not taken in an image to be transmitted from the calling party, the image transmitted from the called party can be displayed, so that the utility of the mobile terminal 100 is improved.

As described above, according the mobile terminal 100 of this illustrative embodiment, when an incoming call using the video phone function has occurred or when performing outgoing call using the video phone function, when the remaining amount of the battery of the mobile terminal 10 is less than a predetermined value, the control unit 10 executes control to perform only an audio communication without performing communication using the video phone function.

Since the communication using the video phone function consumes more power than the audio communication, the switching of the video phone function to the audio communication can suppress the power consumption, thereby prolonging the communication time with the called party.

In addition, according the mobile terminal 100 of this illustrative embodiment, when an incoming call using the video phone function has occurred or when performing outgoing call using the video phone function, when the communication rate of the mobile terminal 100 is slower than a predetermined value, the control unit 10 executes control to perform only an audio communication without performing communication using the video phone function. Further, when the communication rate of the mobile terminal 100 becomes faster by a predetermined value or greater, the control unit 10 resumes the communication using the video phone function.

Thereby, it is possible to appropriately switch the communication using the video phone function and the audio communication depending on the communication environments of the mobile terminal 100.

According to the mobile terminal 100 of the illustrative embodiment, when an incoming call using the video phone function has occurred or when performing outgoing call using the video phone, the face information detection unit 8 determines whether a user's face is taken in the image captured by the imaging unit 1 for imaging the user's face. Only when it is determined that a user's face is taken in the image, the communication using the video phone function starts. On the other hand, when a user's face is not taken or even though a user's face is taken, when a size of the image captured is smaller than a predetermined size, the control unit 10 executes control to perform no communication using the video phone function and to perform only audio communication.

Accordingly, it is possible to avoid a situation in which, even though the communication using the video phone function has started, the called party cannot recognize a face of the calling party. Thus, it is possible to suppress the called party from feeling a sense of strangeness.

According to the mobile terminal 100 of the illustrative embodiment, it is possible to avoid a situation in which, even though the communication using the video phone function has started, the called party cannot recognize a face of the calling party. Thus, it is possible to suppress the called party from feeling a sense of strangeness. When an incoming call using the video phone function has occurred or when performing outgoing call using the video phone, the luminous intensity detection unit 7 determines the luminous intensity at the front side of the mobile terminal 100 to which the imaging unit 1 is provided. When the luminous intensity is higher than a predetermined luminous intensity, the communication using the video phone function starts, and when the luminous intensity is lower than a predetermined luminous intensity, the control unit 10 executes control to perform no communication using the video phone function and to perform only audio communication.

Therefore, it is possible to appropriately avoid a situation in which, even though the communication using the video phone function has started, the called party cannot recognize a face of the calling party. Thus, it is possible to suppress the called party from feeling a sense of strangeness.

In addition, as described above, according to the mobile terminal 100 of the illustrative embodiment, when the luminous intensity, which is detected by the luminous intensity detection unit 7 every predetermined time period, is lower than a predetermined luminous intensity, the luminous intensity detection by the luminous intensity detection unit 7 may be performed every predetermined time period even after the audio communication with the called party has started. Furthermore, when the luminous intensity becomes equal to or higher than a predetermined value during the audio communication, the control unit may notify the user of the situation at that time and enable the user to select whether or not to start the communication using the video phone function. Alternatively, when the luminous intensity becomes equal to or higher than a predetermined value during the audio communication, the imaging unit 1 may be automatically enabled to image the user's face and the face information detection unit 8 may determine whether a user's face is in the image captured by the imaging unit 1. When the user's face is detected, the communication using the video phone function may automatically start.

In addition or alternatively, when the face information detection unit 8 determines in step ST11 that a user's face is not detected in the image captured by the imaging unit 1, the face information detection unit 8 may perform the process of detecting a user's face in the image captured by the imaging unit 1 every predetermined time period even after the audio communication with the called party has started in step ST14. Furthermore, when a user's face is detected, the communication using the video phone function may automatically start at that time.

In addition, even when the image is not transmitted from the calling party (i.e., even when the luminous intensity detection unit 7 determines that the luminous intensity is lower than a predetermined value or the user's face is not detected in the image, which is captured by the imaging unit 1, by the face information detection unit 8), when an image for the video phone function is transmitted from the called party, the image may be displayed on the display unit 3. Thereby, even when the image for the video phone function cannot be transmitted because a user's face is not appropriately taken in the image to be transmitted from the calling party, the image transmitted from the called party can be displayed, so that the utility of the mobile terminal 100 is improved.

Thus, according to the mobile terminal 100 of the illustrative embodiment, when an incoming call using the video phone function has occurred, it is determined whether the video phone function is in an effective condition. When it is determined that the video phone function is not in the effective condition, the communication using the video phone function can be switched over to the audio communication. In addition, when the video phone function becomes in the effective condition after it is determined that the video phone function is not in the effective condition, the audio communication is switched over to the communication using the video phone function, so that the communication using the video phone function can be resumed.

The invention is not limited to the above-described illustrative embodiments.

In other words, many changes and alternatives may be made to the illustrative embodiments within the technical scope of the invention and its equivalents.

For example, in the above-described illustrative embodiments, the face detection of the face information detection unit 8 is performed after the luminous intensity detection of the luminous intensity detection unit 7. However, the invention is not limited thereto. For example, the face detection of the face information detection unit 8 may be performed without the luminous intensity detection of the luminous intensity detection unit 7 or before the luminous intensity detection. As a result, when a face is not detected by the face information detection unit 8 or when a size of the detected face is smaller than a predetermined size, the communication using the video phone function may be ended or switched over to the audio communication by a user's selection or automatically.

In the above-described illustrative embodiments, the control unit 10 determines whether the predetermined condition is satisfied, based on the face detection result by the face information detection unit 8 or the luminous intensity detected by the luminous intensity detection unit 7. However, the invention is not limited thereto. For example, the control unit may perform the determination, based on brightness or blur of an image captured by the imaging unit 1. In other words, when brightness or blur of an image captured by the imaging unit 1 is lower than a predetermined value, the control unit may determine that the predetermined condition is not satisfied, and when the brightness or blur is equal to or higher than a predetermined value, the control unit may determine that the predetermined condition is satisfied. Thereby, since the execution of the video phone function based on the image having low brightness, which is captured by the imaging unit 1, is suppressed, the sense of strangeness with the other party is reduced. Incidentally, the predetermined condition may be other conditions controlling visibility of an image.

In the above-described illustrative embodiments, the mobile terminal 100 is a mobile phone or PHS. However, the invention is not limited thereto. For example, other mobile terminals having an imaging unit may be possible, such as PDA (Personal Digital Assistant). In the mobile terminal 100 of the above-described illustrative embodiments, the image signal of the user's face and the audio signal output from the audio I/O unit 6 are overlapped and then transmitted/received by the communication unit 2, as data for video phone. However, the invention is not limited thereto. For example, even when the video phone function is executed, the image signal of the user's face and the audio signal output from the audio I/O unit 6 may be individually transmitted and received to and from the called party.

Although the invention has been specifically described with reference to the specific illustrative embodiments, it will be appreciated by those skilled in the art that many modifications and variations may be made without departing from the spirit and scope of the invention.

This application claims the priority of Japanese Patent Application No. 2008-220444 filed on Aug. 28, 2008, the disclosures of which are incorporated herein by reference.

Industrial Applicability

According to the invention, it is possible to switch the video phone function and the typical audio communication depending on whether the video phone function is in the effective condition, so that the invention is useful for a communication device having a video phone function, and the like.

DESCRIPTION OF REFERENCE NUMERALS AND SINGS

100: mobile terminal
1: imaging unit
2: communication unit
3: display unit
4: operation unit
5: storage unit
6: audio I/O unit
7: luminous intensity detection unit
8: face information detection unit
9: casing state detection unit
10: control unit

The invention claimed is:

1. A communication device comprising:
an imaging unit;
a display unit;
a control unit that executes a video phone function based on an image captured by the imaging unit; and
an audio detection unit, wherein
the control unit suppresses execution of the video phone function when the image captured by the imaging unit satisfies a predetermined condition, and
when there is a request for call using the video phone function, if the image captured by the imaging unit satisfies the predetermined condition, the control unit suppresses starting of a call corresponding to the request for the call using the video phone function.

2. The communication device according to claim 1, further comprising a face information detection unit that detects information about a user's face from the image captured by the imaging unit, wherein
the control unit suppresses the execution of the video phone function when the user's face is not detected from the image captured by the imaging unit by the face information detection unit.

3. The communication device according to claim 1, wherein
the control unit releases the execution suppression of the video phone function when the image captured by the imaging unit does not satisfy the predetermined condition while suppressing the execution of the video phone function.

4. A communication device comprising:
a luminous intensity detection unit;
a display unit;
an imaging unit;
an audio detection unit; and
a control unit that executes a video phone function based on an image captured by the imaging unit, wherein
the control unit suppresses execution of the video phone function when a luminous intensity lower than a predetermined luminous intensity is detected by the luminous intensity detection unit, and
when there is a request for call using the video phone function, if the luminous intensity detected by the luminous intensity detection unit is lower than the predetermined luminous intensity, the control unit suppresses starting of a call corresponding to the request for the call using the video phone function.

5. The communication device according to claim 4, wherein
the control unit suppresses the execution of the video phone function by suppressing transmission of the image captured by the imaging unit while transmitting audio detected by the audio detection unit.

6. The communication device according to claim 4, wherein the control unit releases the execution suppression of the video phone function when a luminous intensity higher than the predetermined luminous intensity is detected by the luminous intensity detection unit while suppressing the execution of the video phone function.

7. The communication device according to claim 1, wherein
when a face is detected from the image captured by the imaging unit before communication using the video phone function, the control unit is operable to start the communication by using the video phone function.

8. The communication device according to claim 4, wherein
when a face is detected from the image captured by the imaging unit before communication using the video phone function, the control unit is operable to start the communication by using the video phone function.

9. A communication device comprising:
an imaging unit;
a display unit;
a control unit that executes a video phone function based on an image captured by the imaging unit; and
an audio detection unit, wherein
the control unit suppresses execution of the video phone function when the image captured by the imaging unit satisfies a predetermined condition, and
when there is a request for call using the video phone function, if the image captured by the imaging unit satisfies the predetermined condition, the control unit suppresses a transmission of a request for a call corresponding to the request for the call using the video phone function.

10. The communication device according to claim 1, wherein
the control unit measures a communication rate, and
when the measured communication rate is less than a predetermined value, the control unit suppresses the execution of the video phone function.

* * * * *